United States Patent Office 3,149,105
Patented Sept. 15, 1964

3,149,105
NOVEL SYNTHESIS OF CYANINES AND MEROCYANINES
Henri Larive, Clichy, and René J. Dennilauler, Paris, France, assignors to Eastman Kodak Company, Rochester, N.Y., a corporation of New Jersey
No Drawing. Filed Sept. 14, 1961, Ser. No. 138,003
2 Claims. (Cl. 260—240.7)

This invention relates to a novel process for the direct synthesis of dye intermediates and more particularly to the direct synthesis of quaternized dye intermediates used for the synthesis of pseudocyanine and merocyanine dyes useful for making photographic silver halide emulsions.

It is known to produce pseudocyanine dyes by the condensation of two quarternary salts of heterocyclic compounds substituted in the 2-position, one by a halogen atom and the other by a methyl group, in the presence of a basic condensation agent, such as triethylamine. The reaction can be represented, for example, by means of the following equation:

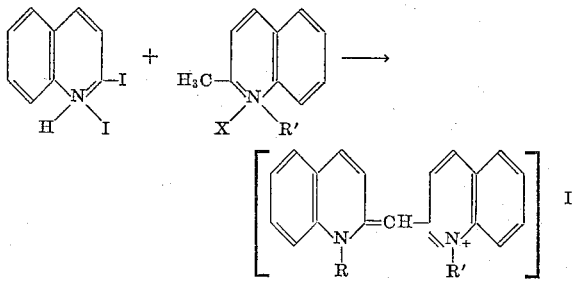

where R and R' each represent an alkyl group and X represents an anion, e.g., a halogen atom. The 2-halogenated derivative used in this condensation is obtained by means of a series of reactions which comprises, for example, in the case of the derivative of the 2-quinoline of the above formula, the chlorination of a 1-alkyl-2-(1H)-quinolone to produce the 2-chloroquinoline, followed by the quaternization of said 2-chloroquinoline. For reasons of convenience, one generally used an alkyl iodide as the quaternizing agent. Consequently, the final cyanine dye is obtained in the form of an iodide that is rather difficulty soluble and, as a result, difficult to incorporate in certain emulsions.

It has been suggested to reacted phosphorous oxychloride and phosphorous pentachloride with heterocyclic ketones; however, this reaction leads to nonquaternized chlorinated derivatives.

Syntheses for preparing cyanine and merocyanine dyes with fewer steps are desired. It is also desired to prepare more soluble salts of these dyes so they can be used more easily in the preparation of photographic emulsions.

It is, therefore, an object of our invention to provide a novel method for preparing pseudocyanine and merocyanine dyes with fewer steps than have been required by methods used heretofore.

Another object is to provide a novel synthesis for preparing pseudocyanine dyes in the form of the chloride, which is desired for solubility purposes and which can readily be converted to the bromide or iodide.

Another object of our invention is to provide a direct method for producing quaternized N-alkylated 2-chlorinated heterocyclic dye intermediates as chloride salts.

Still other objects will become apparent from the following specification and claims.

According to our invention, quaternary salts of 2-chlorinated heterocyclic compounds are prepared directly by the action of phosphorous oxychloride and/or phosphorous pentachloride on the corresponding heterocyclic ketones by operating the reaction at a temperature that is a function of the heterocyclic compound and by using an appropriate solvent.

The process according to our invention consists in reacting an N-alkylated heterocyclic ketone having the formula:

(I) 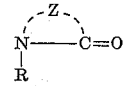

where R represents an alkyl group, such as methyl, ethyl, n-propyl, isobutyl, n-butyl, n-amyl, isoamyl, carbethoxymethyl, β-hydroxyethyl, carbomethoxymethyl, benzyl, etc.; and Z represents the nonmetallic atoms necessary to complete a heterocyclic ring having 5 to 6 atoms in the heterocyclic rings, such as those of the 2-quinoline series, e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc., those of the 2-pyridine series, e.g., pyridine, 3-methylpyridine, 3-methoxypyridine, 3-ethoxypyridine, 3-hydroxypyridine, etc., the thiazole series, e.g., thiazole, 4-methylthiazole, 4-phenylthiazole, 5-methylthiazole, 5-phenylthiazole, 4,5-dimethylthiazole, 4,5-diphenylthiazole, etc., those of the benzothiazole series, e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 4 - phenylbenzothiazole, 5 - phenylbenzothiazole, 4 - methoxybenzothiazole, 5 - methoxybenzothiazole, 6-methoxybenzothiazole, 5-iodobenzothiazole, 4-ethoxybenzothiazole, 5-ethoxybenzothiazole, tetrahydrobenzothiazole, etc., those of the naphthothiazole series, e.g., α-naphthothiazole, β-naphthothiazole, 5-methoxy-β-naphthothiazole, 5-ethoxy-β-naphthothiazole, etc., those of the oxazole series, e.g., 4-methyloxazole, 5-methyloxazole, 4 - phenyloxazole, 4,5 - diphenyloxazole, 4 - ethyloxazole, etc., those of the benzoxazole series, e.g., 5-methylbenzoxazole, 5-phenylbenzoxazole, 6-methoxybenzoxazole, 4-ethoxybenzoxazole, etc., those of the naphthoxazole series, e.g., α-naphthoxazole, β-naphthoxazole, etc., those of the selenazole series, e.g., 4-methylselenazole, 4-phenylselenazole, etc., those of the benzoselenazole series, e.g., benzoselenazole, 5 - chlorobenzoselenazole, 5 - methoxybenzoselenazole, 5 - hydroxybenzoselenazole, tetrahydrobenzoselenazole, etc., and those of the naphthoselenazole series, e.g., α-naphthoselenazole, β-naphthoselenazole, etc., with phosphorous oxychloride and/or phosphorous pentachloride in a suitable solvent and at a temperature lower than the dequaternization temperature of the quarternary salt, then condensing the quaternary salt formed represented by the formula:

(II) 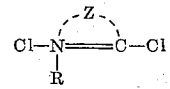

where R and Z are as defined previously, with a quaternary salt of a 2-methylated heterocyclic compound represented by the formula:

(III) 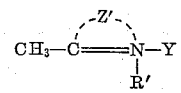

where R' and Z' may represent any of the groups defined by R and Z, respectively, and Y represents an anion, e.g., a halogen atom, such as chlorine, bromine, iodine, etc., the ethylsulfate ion, the tosylate ion, etc., in the presence of a basic condensing agent to produce a pseudocyanine dye having the formula:

(IV)

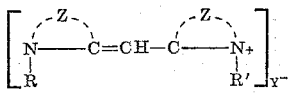

where R, R', Z, Z' and Y are as defined previously.

When Y in Formula IV is a chlorine atom, and a pseudocyanine bromide or iodide is desired, the condensation reaction is carried out in the presence of ammonium bromide or ammonium iodide respectively or the corresponding alkali metal bromide or iodide. Alternatively, the pseudocyanine chloride can readily be converted to the bromide or iodide by double decomposition with the ammonium or alkali metal bromide or iodide, respectively.

The process according to the invention, therefore, has the advantage of avoiding one reaction step of the former processes, since one passes directly from the heterocyclic ketone to the quaternary salt of the chlorinated intermediate and from the quaternary salt to the pseudocyanine. Moreover, it is possible to obtain directly the cyanine chloride or cyanine bromide. They are more soluble and, in certain cases, more easily incorporated than the iodide in photographic emulsions.

According to a variation in the process of our invention, one can prepare merocyanines by reacting an intermediate compound of Formula II with a heterocyclic compound with a reactive methylene group represented by the formula:

(V)

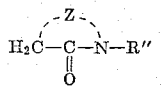

where R'' represents a hydrogen atom, an alkyl group, such as methyl, ethyl, propyl, butyl, amyl, carbethoxymethyl, 2-hydroxyethyl, benzyl, etc., an aryl group, such as phenyl, 4-methylphenyl, 4-propylphenyl, 4-ethoxyphenyl, 2,4-dichlorophenyl, etc.; and W represents the nonmetallic atoms required to complete a heterocyclic ring, such as compounds of the rhodanine series, e.g., rhodanine, 3-methylrhodanine, 3-propylrhodanine, 3-amylrhodanine, 3-phenylrhodanine, etc., those compounds of the 2-thiazolin-4-one series, e.g., 2-thiazolin-4-one, 2-diphenylamino-2-thiazolin-4-one, 2-ethylphenylamino-2-thiazolin-4-one, 2-anilino-2-thiazolin-4-one, etc., those compounds of the 2-thio-2,4-oxazolidinedione series, e.g., 2-thio-2,4-oxazolidinedione, 3-ethyl-2-thio-2,4-oxazolidinedione, 3-heptyl-2-thio-2,4-oxazolidinedione, 3-phenethyl-2-thio-2,4-oxazolidinedione, etc., those compounds of the hydantoin series, e.g., hydantoin, 1,3-diethylhydantoin, 1-ethyl-3-phenylhydantoin, etc., those of the thiohydantoin series, e.g., thiohydantoin, 1,3-dipropyl-2-thiohydantoin, 3-ethyl-1-phenyl-2-thiohydantoin, etc., and those of the 5-pyrazolone series, e.g., 5-pyrazolone, 3-methyl-1-phenyl-5-pyrazolone, etc., to make a merocyanine dye having the formula represented by the formula:

(VI)

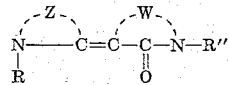

where R, R'', Z and W are as defined previously.

The dequaternization temperature of the compounds of Formula II depends upon the nature of the heterocyclic ring and to a certain extent on the nature of the alkyl group that is eliminated. The following table lists the dequaternization temperatures of various representative quaternary salts and illustrates the effect of varying the heterocyclic ring and the R group.

TABLE I

| Quaternary salt: | Dequaternization temperature °C. |
|---|---|
| 1-Methyl-2-chloroquinolinium chloride | 124° |
| 1-Ethyl-2-chloroquinolinium chloride | 130° |
| 1-Ethyl-2-chloropyridinium chloride | 140–145° |
| 3-Methyl-2-chlorobenzothiazolium chloride | 150–155° |
| 3-Ethyl-2-chlorobenzothiazolium chloride | 145–150° |
| 3-Methyl-2-chlorobenzoxazolium chloride | 155–160° |
| 3-Ethyl-2-chlorobenzoxazolium chloride | 175–180° |

The dequaternization temperature can be determined, as follows, for any of the other quaternary intermediates that might be used. A sample of the quaternary salt is dissolved or suspended in a high-boiling solvent such as o-dichlorobenzene. The mixture is gradually heated. The temperature at which bubbles appear, indicating the evolution of alkyl chloride, is the dequaternization temperature.

The use of phosphorous oxychloride as the chlorinating agent is general in the process of our invention. In certain instances, however, it is preferable to use phosphorous pentachloride or a mixture of phosphorous oxychloride and phosphorous pentachloride.

One can use to advantage chlorinated solvents, such as o-dichlorobenzene, p-dichlorobenzene, chlorobenzene, carbontetrachloride, chloroform, dichloroethane, etc.

For the isolation and the purification of the intermediates according to the invention, one uses advantageously successive washes of chloroform and ether. Other well known solvents may also be used. Their selection will depend upon the solubility characteristics of the dye intermediate.

Some compounds of Formula II that are particularly advantageous according to the invention are compounds, such as those of the N-substituted-2-chloroquinolinium chloride series, those of the N-substituted-2-chloropyridinium chloride series, those of the N-substituted-2-chlorothiazolium chloride series, those of the N-substituted-2-chlorobenzothiazolium chloride series, those of the N-substituted-2-chloronaphthothiazolium chloride series, those of the N-substituted-2-chlorooxazolium chloride series, those of the N-substituted-2-chlorobenzoxazolium chloride series, etc.

A very useful compound in the synthesis of cyanines is 1-ethyl-2-iodoquinolinium iodide. Its synthesis by methods known before required two reaction steps:

(1) The chlorination of 1-methyl-2(1H)-quinolone by means of phosphorous pentachloride to produce 2-chloroquinoline.

(2) The quaternization of this compound with ethyl iodide to produce 1-ethyl-2-iodoquinolinium iodide.

This dye intermediate, however, leads to dyes that have limited solubilities for incorporation in photographic emulsions.

According to our invention the 2-chloro-1-ethylquinoliniumchloride is produced by a single reaction step. Thus, an expensive intermediate step involving the separation of the chlorinated derivatives by vacuum distillation is no longer needed. Furthermore, the use of ethyl diodide and the laborious pulverizing and washing in acetone of the resulting derivative is eliminated. Another valuable advantage of our synthesis is the ease with which the pseudocyanine dye chloride formed from our compound of Formula II is converted to the corresponding bromide or iodide, thus providing dyes with a broad range of solubilities. This flexibility does not exist with the syntheses available heretofore since the dye iodide produced thereby is costly to convert into the bromide or chloride.

The condensation of compounds of Formula II with those of Formula III or V is accelerated advantageously by heating the reaction mixture to temperatures ranging from room temperature (about 20° C.) to the reflux temperature of the reaction mixture. The condensation reactions are carried out in the presence of an inert solvent, such as pyridine, nitrobenzene, ethanol, n-propanol, isopropanol, n-butanol and many other well known solvents. The condensations are advantageously carried out in the presence of a basic condensation agent, such as the trialkylamines (e.g., triethylamine, tri-n-propylamine, tri-isopropylamine, tri-n-butylamine, tri-isobutylamine, tri-n-amylamine, etc.), the N-alkylpiperidines (e.g., N-methylpiperidine, N-ethylpiperidine, etc.), the N,N-dialkylanilines (e.g., N,N-dimethylaniline, N,N-diethylaniline, etc.).

The process according to the invention is used advantageously to prepare a great number of pseudocyanines and merocyanines that are used for sensitizing silver halide photographic emulsions. The following typical representative examples will serve to illustrate the invention, however, it is to be understood that the invention is not limited by these examples.

*Example 1.—Preparation of 2-Chloro-1-Methylquinolinium Chloride*

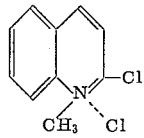

A solution of 16 g. (0.1 mole) of 1-methyl-2-(1H)-quinolone in 10 cc. of anhydrous chloroform was heated to reflux. Then 10 cc. (0.1 mole plus 10% excess) of distilled phosphorous oxychloride was slowly added and the mixture refluxed for fifteen minutes. Then the dichloride derivative was precipitated by the addition of benzene, isolated and air dried. It was then recrystallized from 50 cc. of warm benzene, and dried under vacuum to give 19 g. (88%) of product.

According to another procedure 10 g. (0.063 mole) of 1-methyl-2(1H)-quinolone was dissolved in 10 cc. of o-dichlorobenzene. Another solution was made by heating to 80° C. 10 g. (0.048 mole) of phosphorous pentachloride in 50 cc. of o-dichlorobenzene. The two solutions were mixed without heat and the 2-chloro-1-methylquinolinium chloride precipitated. A 12 gram (89%) yield of the desired product was obtained having a melting point of 92° C.

*Analysis.*—Calculated for $C_{10}H_9Cl_2N$: Cl, 33.2%. Found: Cl, 33.5%.

*Example 2.—Preparation of 2-Chloro-1-Ethylquinolinium Chloride*

The method of Example 1 but using 1-ethyl-2(1H)-quinolone was used to produce a 92 percent yield of 2-chloro-1-ethylquinolinium chloride with a melting point of 115° C.

*Analysis.*—Calculated for $C_{11}H_{11}Cl_2N$: Cl, 31.14%. Found: Cl, 30.95%.

*Example 3.—Preparation of 2-Chloro-1-Ethylpyridinium Chloride*

A mixture of 65 g. (0.61 mole) of 1-ethyl-2(1H)-pyridone and 125 g. (0.61 mole) of phosphorous pentachloride in 100 cc. of o-dichlorobenzene was heated to 100° C. for one hour. The solvent was decanted and the product was dissolved in 100 cc. of cold alcohol. The ethochloride separated as an oil with ether. This oil crystallized under vacuum. A yield of 72% of the desired product was obtained. M.P. 110° C.

*Analysis.*—Calculated for $C_7H_9Cl_2N$: Cl, 40.0%. Found: Cl, 39.4%.

*Example 4.—Preparation of 2-Chloro-3-Methylbenzothiazolium Chloride*

100 g. (0.6 mole) of 3-methyl-2-(3H)-benzothiazolone in 100 cc. of phosphorous oxychloride was heated to 160° C., 90 g. (0.48 mole) of phosphorous pentachloride was slowly added. Heating was continued for four hours. The methochloride salt separated in mass. It was dried without heat and washed five or six times with hot chloroform and with o-dichlorobenzene. 96.5 g. (66% yield) of desired product was obtained, M.P. 110° C.

*Analysis.*—Calculated for $C_8H_7Cl_2NS$: Cl, 32.3%. Found: Cl, 32.5%.

In a similar manner 2-chloro-3-ethylbenzothiazolium chloride was formed, M.P. 45°–47° C. This product was very hygroscopic and difficult to purify.

*Example 5.—Preparation of 2-Chloro-3-Methylbenzoxazolium Chloride*

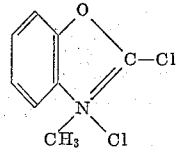

40 g. (0.27 mole) of 3-methyl-2(3H)-benzoxazolone and 56 g. (0.27 mole) of phosphorous pentachloride were dissolved in 200 cc. of phosphorous oxychloride at a temperature below 20° C. The solution was agitated for one hour, the methochloride salt which precipiated was isolated, air dried and washed with chloroform and ether. 27.5 g. (50%) of the product, a very hygroscopic material, was obtained, M.P. 73°–74° C.

*Analysis.*—Calculated for $C_8H_7Cl_2NO$: Cl, 34.8%. Found: Cl, 35.4%.

The corresponding ethochloride, M.P. 175–180° C., was produced by the same process with a yield of 55 percent.

Examples 6 to 15 illustrate the manner by which one transforms the intermediates according to our invention into cyanine dyes used as sensitizers in photographic emulsions.

*Example 6.—Preparation of 1,1'-Diethyl-2,2' Cyanine Chloride*

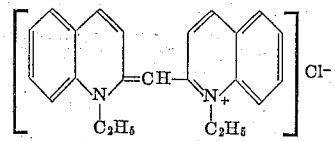

5 g. (0.022 mole) of 2-chloro-1-ethylquinolinium chloride and 6.5 g. (0.022 mole) of quinaldine ethoethylsulfate were dissolved in 5 cc. of chlorine water. The mixture was agitated vigorously at a temperature below 10° C. and 6 cc. (0.047 mole) of triethylamine was slowly added. The dye was dried without heat, and recrystallized from alcohol. A yield of 5 g. (63%) of the cyanine chloride was obtained, M.P. 215° C.

*Analysis.*—Calculated for $C_{23}H_{23}ClN_2$: N, 7.72%. Found: N, 7.62%.

*Example 7.—Preparation of 1,1'-Diethyl-2,2' Cynanine Bromide*

A mixture of 20 cc. of alcohol, 20 g. (0.088 mole) of 1-ethyl-2-chloroquinolinium chloride and 22 g. (0.088 mole) of quinaldine ethobromide was brought to reflux. To this was added slowly 60 cc. (0.47 mole + 200% excess) of triethylamine. Then red dye crystallized slowly. This reaction was also carried out in water as solvent.

The 14.2 g. (80%) of product obtained melted at 225° C. with decomposition.

*Analysis.*—Calculated for $C_{23}H_{23}BrN_2$: N, 6.87%. Found: N, 6.92%.

*Example 8.—Preparation of 1,1'-Diethyl-2,2'-Cyanine Iodide*

Prepared as in Example 7 but in the presence of potassium iodide. The product was obtained with a yield of 87%, M.P. 265° C. with decomposition.

*Analysis.*—Calculated for $C_{23}H_{23}IN_2$: N, 6.17%. Found: N, 6.22%.

*Example 9.—Preparation of 1-Ethyl-1'-Methyl-2,2'-Cyanine Bromide*

60 cc. of triethylamine was added with agitation to a mixture of 21 g. of 2-chloro-1-methylquinolinium chloride and 25 g. of quinaldine ethobromide in 50 cc. of water and 27.5 g. (70%) of the dye was obtained M.P. 220° C.

*Analysis.*—Calculated for $C_{22}H_{21}BrN_2$: N, 7.12%. Found: N, 7.12%.

*Example 10.—Preparation of 1-Ethyl-1'-Methyl-2,2'-Cyanine Iodide*

The product of Example 9 was reacted with potassium iodide to produce 34 g. (77%) of the corresponding cyanine iodide, M.P. 260° C. with decomposition.

*Analysis.*—Calculated for $C_{22}H_{21}IN_2$: N, 6.36%. Found: N, 6.31%.

*Example 11.—Preparation of 1'-Ethyl-3-Methylthia-2'-Cynanine Iodide*

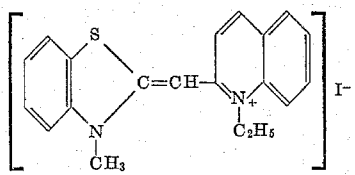

2.2 g. (0.01 mole) of 2-chloro-3-methylbenzothiazolium chloride and 3.4 g. (0.01 mole) of quinaldine ethotosylate in 20 cc. of cold water were agitated violently. 3 cc. (0.03 mole) of triethylamine was added slowly. An orange coloration appeared and 4 g. of potassium iodide dissolved in 10 cc. of water was then added. The dye was dried without heat and recrystallized from dimethylformamide, 3.3 g. (75% yield) of the dye was obtained, M.P. 280° C., with decomposition.

*Analysis.*—Calculated for $C_{20}H_{19}IN_2S$: N, 6.27%. Found: N, 6.23%.

*Example 12—Preparation of 3,3'-Dimethylthiacyanine Chloride*

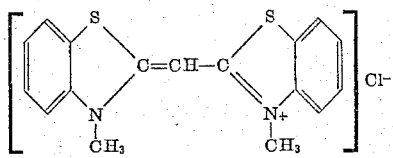

2.2 g. (0.01 mole) of 2-chloro-3-methylbenzothiazolium chloride and 1.6 g. (0.01 mole) of 2-methylene-3-methylbenzothiazoline were dissolved in 10 cc. of m-cresol. At the end of the evolution of HCl gas, 5 cc. (0.04 mole) of triethylamine was slowly added and the mixture heated to 100° C. for five minutes. The dye was precipitated by the addition of isopropyl ether. 2.8 g. (81% yield) of the desired product was obtained, M.P. 281° C.

*Analysis.*—Calculated for $C_{17}H_{15}ClN_2S_2$: N, 8.07%. Found: N, 8.10%.

*Example 13.—Preparation of 1,3'-Dimethyl-2-Pyridothiacyanine Iodide*

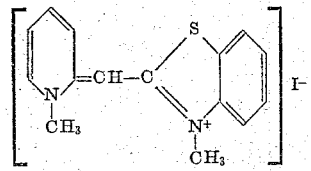

5.5 g. (0.031 mole) of 2-chloro-1-methylpyridinium chloride and 8.6 g. (0.031 mole) of 2,3-dimethylbenzothiazolium methylsulfate were dissolved in 20 cc. of ethyl alcohol. 13 cc. (0.090 mole) of triethylamine was slowly added and the mixture refluxed for thirty minutes. On cooling the dye precipitated as the iodide salt by adding an aqueous solution of potassium iodide. A yield of 7.8 g. (51%) of dye was obtained, M.P. 270° C.

*Analysis.*—Calculated for $C_{16}H_{17}ISN_2$: N, 7.06%. Found: N, 7.10%.

*Example 14.—Preparation of 3,3'-Dimethyloxathiacyanine Iodide*

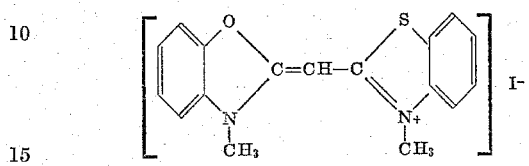

2.0 g. (0.01 mole) of 2-chloro-3-methylbenzoxazolium chloride and 2.7 g. (0.01 mole) of 2,3-dimethylbenzothiazolium methylsulfate were rapidly dissolved in 10 cc. of m-cresol. 4.1 cc. (0.03 mole) of triethylamine were added and the mixture agitated for ten minutes. By double decomposition with potassium iodide, 1.7 g. (40% yield) of the dye were obtained, M.P. 315° C.

*Analysis.*—Calculated for $C_{17}H_{15}IN_2OS$: N, 6.64%. Found: N, 6.62%.

*Example 15.—Preparation of 1'-Ethyl-3-Methylthia-2'-Cyanine Bromide*

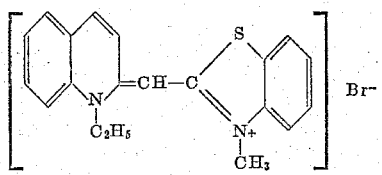

2 g. (0.0088 mole) of 2-chloro-1-ethylquinolium chloride and 2.4 g. (0.0088 mole) of 2,3-dimethylbenzothiazolium methylsulfate in 20 cc. of alcohol were refluxed. To this was added slowly 2.55 cc. (0.0264 mole) of triethylamine. By the addition of an aqueous solution of potassium bromide, 2.75 g. (78%) of dye was obtained by precipitation, M.P. 240°–245° C.

*Analysis.*—Calculated for $C_{20}H_{19}BrN_2S$: N, 7.01%. Found: N, 7.08%.

Similarly other pseudocyanines are prepared.

The intermediates of Formula II are also used advantageously to prepare merocyanines. The following example illustrates this variation of our invention.

*Example 16.—Preparation of 5-[3-Methyl-2-(H)-Benzothiazolylidene]-3-Ethylrhodanine*

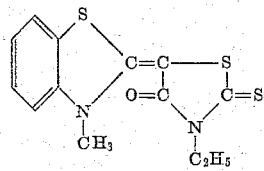

1.0 g. (0.0045 mole) of 2-chloro-3-methylbenzothiazolium chloride and 0.73 g. (0.0045 mole) of 3-ethylrhodanine in 5 cc. of ethanol was refluxed. The merocyanine was formed by the addition of 0.5 cc. (0.036 mole) of triethylamine. The product obtained 1.1 g. (80%) sublimed at 230° C. and melted at 265° C.

*Analysis.*—Calculated for $C_{13}H_{12}N_2OS_3$: N, 9.09%. Found: N, 9.11%.

In a similar manner the intermediates of Formula II are condensed with other intermediates of Formula V to produce other merocyanine dyes of Formula VI.

Our novel synthesis is unexpected from the prior art since earlier attempts to make the dichlorinated derivatives of heterocyclic compounds in the form of a 2-chlorosubstituted quaternary salt were unsuccessful.

The novel synthesis of our invention provides a direct process for making N-substituted-2-chlorosubstituted heterocyclic intermediates as the chloride salts which are valuable for preparing pseudocyanine and merocyanine dyes used in photographic silver halide emulsions. Our process is characterized by requiring only one step compared to two or more steps required by the prior art processes. Our direct synthesis eliminates a laborious grinding operation and an expensive vacuum distillation step that are required by the prior art process. Our novel process produces the quaternary chlorides of the dye intermediates which are much more desirable to work with than the quaternary iodides produced by the prior art syntheses. The chloride salts of our intermediates can readily be changed to the bromide or iodide salt, while it is very costly to go from the prior art iodide to bromide or chloride salt. The pseudocyanine dye chlorides or bromides made from our intermediates do not have the solubility limitations for use in silver halide emulsions that are characteritsic of some prior art dye iodides.

The invention has been described in detail with particular reference to preferred embodiments thereof, but it will be understood that variations and modifications can be effected within the spirit and scope of the invention as described hereinabove and as defined in the appended claims.

We claim:
1. A process for preparing 3,3'-dimethyloxathiacyanine chloride comprising the steps:
    (1) mixing 3-methyl-2(3H)-benzoxazolone, phosphorous pentachloride and phosphorous oxychloride at a temperature below 20° C. to prepare 2-chloro-3-methylbenzoxazolium chloride; and
    (2) mixing said 2-chloro-3-methylbenzoxazolium chloride and 2,3-dimethylbenzothiazolium methylsulfate dissolved in a cresol in the presence of triethylamine.

2. A process for preparing 3,3'-dimethyloxathiacyanine chloride comprising the steps:
    (1) mixing equimolar amounts of 3-methyl-2(3H)-benzoxazolone and phosphorous pentachloride dissolved in phosphorous oxychloride at a temperature below 20° C.;
    (2) filtering the precipitated 2-chloro-3-methylbenzoxazolium chloride from the reaction mixture; and
    (3) mixing in the presence of triethylamine, equimolar amounts of 2-chloro-3-methyl-benzoxazolium chloride and 2,3-dimethylbenzothiazolium methylsulfate dissolved in a cresol.

References Cited in the file of this patent

UNITED STATES PATENTS

| | | |
|---|---|---|
| 2,170,803 | Brooker | Aug. 29, 1939 |
| 2,231,659 | Brooker et al. | Feb. 11, 1941 |
| 2,245,249 | Brooker | June 10, 1941 |
| 2,921,067 | Larive et al. | Jan. 12, 1960 |

FOREIGN PATENTS

| | | |
|---|---|---|
| 310,815 | Great Britain | July 30, 1930 |

OTHER REFERENCES

Fischer: Ber. d. Deut. Chem. Ges., vol. 31, pages 609–615 (1898) QD 1 D4.

Fischer et al.: Ber. d. Deut. Chem. Ges., vol. 32, pages 1307 to 1315 (1899) QD 1 D4.

Seidel: J. Fur. Prakt. Chem., vol. NF 42, pages 445 to 457 (1890).

Elderfield: "Heterocyclic Compounds," vol. 5, pages 101–102, John Wiley and Sons, N.Y. (1957), QD 400 E4.